United States Patent
Sinclair et al.

(10) Patent No.: US 6,497,299 B1
(45) Date of Patent: Dec. 24, 2002

(54) DRIVE APPARATUS FOR A CYCLE

(75) Inventors: Clive Marles Sinclair, London (GB); Alexander Joseph Kalogroulis, Coulsdon (GB)

(73) Assignee: Sinclair Research Limited, London (GB)

(*) Notice: Subject to any disclaimer, the term of this patent is extended or adjusted under 35 U.S.C. 154(b) by 0 days.

(21) Appl. No.: 09/510,694

(22) Filed: Feb. 22, 2000

(30) Foreign Application Priority Data

Feb. 24, 1999 (GB) .............................................. 9904272

(51) Int. Cl.[7] .............................................. B62K 11/00
(52) U.S. Cl. ...................... 180/205; 180/221; 180/65.2; 180/342
(58) Field of Search .............................. 180/65.2, 65.1, 180/342, 205, 206, 221

(56) References Cited

U.S. PATENT DOCUMENTS

| | | | | |
|---|---|---|---|---|
| 1,394,328 A | * | 10/1921 | Miller | 474/139 |
| 1,436,788 A | * | 11/1922 | Baker | 180/221 |
| 2,350,791 A | * | 6/1944 | Mennesson | 180/31 |
| 2,451,965 A | * | 10/1948 | Longenecker | 180/33 |
| 2,493,275 A | * | 1/1950 | Thornton | 180/33 |
| 2,578,886 A | * | 12/1951 | Isherwood et al. | 180/33 |
| 3,225,854 A | * | 12/1965 | Goerner | 180/33 |
| 3,431,994 A | * | 3/1969 | Wood | 180/31 |
| 3,939,931 A | * | 2/1976 | Benz | 180/13 |
| 3,966,007 A | * | 6/1976 | Havener et al. | 180/34 |
| 4,014,402 A | * | 3/1977 | Muto | 180/222 |
| 4,175,629 A | * | 11/1979 | Kalajzich | 180/220 |
| 4,386,675 A | | 6/1983 | Landon | 180/221 |
| 5,237,263 A | * | 8/1993 | Gannon | 180/205 |
| 5,423,393 A | * | 6/1995 | Felt | 180/221 |
| 5,470,281 A | * | 11/1995 | Sinclair | 474/139 |
| 5,799,747 A | | 9/1998 | Olsen | 180/221 |
| 5,826,674 A | * | 10/1998 | Taylor | 180/219 |
| 6,102,148 A | * | 8/2000 | Chien | 180/220 |
| 6,173,801 B1 | * | 1/2001 | Kakutani et al. | 180/220 |
| 6,209,899 B1 | * | 4/2001 | OaNeil | 280/220 |

FOREIGN PATENT DOCUMENTS

| | | |
|---|---|---|
| EP | 0155185 A | 9/1985 |
| EP | 0644110 A2 | 3/1995 |

* cited by examiner

*Primary Examiner*—Brian L. Johnson
*Assistant Examiner*—Bridget Avery
(74) *Attorney, Agent, or Firm*—Iandiorio & Teska; Jason D. Shanske; Kirk Teska

(57) ABSTRACT

Drive apparatus (2) for a cycle (4), comprising an electric motor (6), a first pulley (8) driven by electric motor (6), a second pulley (10), an endless belt (12) which passes around two pulleys (8, 10) and is driven by first pulley (8), and a swinging link mounting (14). During use, endless belt (12) is in driving engagement with a tire (16) of a wheel (18). Mounting (14) enables the distance between centers of first and second pulleys (8, 10) and tire (16) to vary during use of drive apparatus (2), which enables drive apparatus (2) to exert on tire (16) a varying contact pressure which increases as transmitted torque increases. Mounting (14) comprises an attachment for attaching drive apparatus (2) to cycle (4), and a pivot (24). Drive apparatus (2) is characterised by electric motor (6), pulleys (8, 10) and endless belt (12) forming a transmission which is counter-balanced about pivot (24) such that in an equilibrium position, endless belt (12) is not in contact with tire (16) when drive apparatus (2) is not in use.

12 Claims, 6 Drawing Sheets

DRIVE APPARATUS FOR A CYCLE

This invention relates to a drive apparatus for a cycle. This invention also relates to a cycle when provided with the drive apparatus.

BACKGROUND OF THE INVENTION

In GB-A-2326856 we have described and claimed drive apparatus for a cycle. The drive apparatus described in GB-A-2326856 comprises an electric motor, a first pulley which is driven by the electric motor, a second pulley, an endless belt which passes around the two pulleys and which is driven by the first pulley, and mounting means for mounting the drive apparatus to the cycle. The drive apparatus is such that during use the endless belt is in driving engagement with a tire of a wheel of the cycle. The mounting means is a swinging link mounting means.

SUMMARY OF THE INVENTION

It is an aim of the present invention to improve upon the drive apparatus described in GB-A-2326856.

Accordingly, the present invention provides drive apparatus for a cycle, which drive apparatus comprises an electric motor, a first pulley which is driven by the electric motor, a second pulley, an endless belt which passes around the two pulleys and which is driven by the first pulley, and mounting means for mounting the drive apparatus to the cycle, the drive apparatus being such that during use the endless belt is in driving engagement with a tire of a wheel of the cycle, the mounting means being such that it is a swinging link mounting means which enables the distance between centers of the first and the second pulleys and the tire to vary during use of the drive apparatus and thereby to enable the drive apparatus to exert on the tire a varying contact pressure which increases as transmitted torque increases, the swinging link mounting means comprising attachment means for attaching the drive apparatus to the cycle and pivot means about which the electric motor, the first pulley, the second pulley and the endless belt pivot, and the drive apparatus being characterised in that the electric motor, the first pulley, the second pulley and the endless belt form transmission means which is counter-balanced about the pivot means such that in an equilibrium position the endless belt is not in contact with the tire when the drive apparatus is not in use.

The drive apparatus may be one in which the transmission means is counter-balanced such that in the equilibrium position the endless belt is not more than 10 mm from the tire. Any suitable and appropriate distance may be employed.

The transmission means may be counter-balanced about the pivot means by having equal masses acting on either side of the pivot means. This ensures that jolt-induced accelerations due to road conditions act to create equal forces on either side of the pivot means. There is therefore no moment created due to bumps and the transmission means is able to remain undisturbed with the endless belt remaining slightly away from the tire if there is no power being transmitted, or remaining in contact with the tire if power is being transmitted.

As used, the drive apparatus will include a battery for the electric motor. The weight of the battery is advantageously used as a counter-balance for the weight of the transmission means. Thus the battery may be regarded as a counter-balance for the transmission part of the drive apparatus formed by the electric motor, the first pulley, the second pulley and the endless belt.

Advantageously, the battery acts on an arm which forms a short moment arm. This allows the drive apparatus to be designed such as to be extremely compact. A compact design for the drive apparatus is especially desirable for aesthetic reasons, for mounting reasons, and for space-saving reasons.

The mounting means may comprise a first attachment arrangement for attaching to handlebars or a handlebar stem tube of the cycle, and a second attachment arrangement for attaching to another part of the cycle below the handlebars.

The first attachment arrangement may be at least one clamp.

The second attachment arrangement may be for attaching to a head tube of the cycle. Alternatively, the second attachment arrangement may be for attaching to front forks of the cycle, or a brake assembly of the cycle. Irrespective of where the second attachment arrangement is attached, it may be at least one clamp.

The drive apparatus is preferably situated above a front tire of the cycle such that a line passing through a center of rotation of the second pulley and the pivot means passes between the first mounting point and a seat of the cycle. The line is a line of force and the effect of this line of force is to create a moment that pushes the drive apparatus down against the tire. This moment is resisted by the second attachment arrangement.

Advantageously, the drive apparatus includes a belt reduction gearbox from the electric motor. The belt reduction gearbox operates quietly. If desired, a spur gear reduction gearbox may be employed but this will generally be noisier than the belt reduction gearbox.

The drive apparatus may include a housing for the electric motor, the first pulley and the-second pulley. In this case, the drive apparatus may include an electric power on/off switch positioned within the housing.

The drive apparatus may include link means between the on/off switch and handlebars of the cycle, the link means comprising a length of metal which has a first end for activating the on/off switch and which has a second end positioned below and adjacent handlebars of the cycle for being gripped and pulled by a cyclist. Pulling the second end up will cause the on/off switch to go to its on condition and thus the electric motor will start. Letting the second end go will cause the on/off switch to go to its off condition and thus the electric motor will stop.

The drive apparatus may include dampening means for dampening oscillations of the transmission means relative to the housing.

The dampening means may include an elastic band. Any suitable and appropriate type of dampening means may be employed.

The drive apparatus may include a recess for receiving a mains charger for charging the battery. The drive apparatus may be manufactured and sold with the mains charger.

The drive apparatus may be one in which the second pulley is nearer to the swinging link mounting means than the first pulley.

The housing may have an aperture for receiving a security device for stopping theft of the drive apparatus from the cycle.

The electric motor may be provided with an electric current and temperature limiting device for avoiding overloading of the electric motor such as would generate sufficient heat to damage the electric motor.

BRIEF DESCRIPTION OF THE DRAWINGS

Embodiments of the invention will now be described solely by way of example and with reference to the accompanying drawings in which.

DETAILED DESCRIPTION OF THE INVENTION

Figure 1:
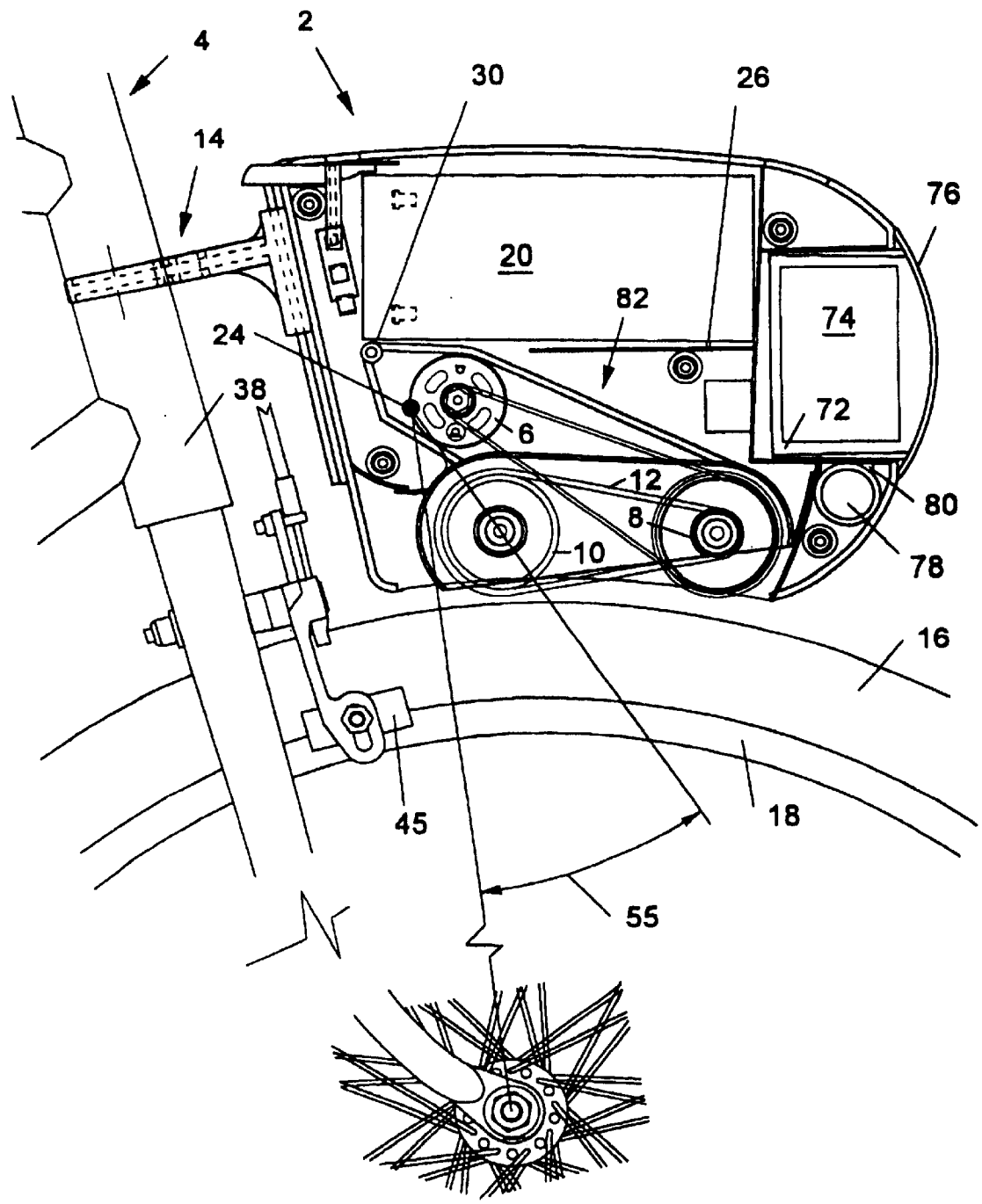
FIG. 1 is a section through drive apparatus mounted on a front wheel of a cycle, the drive apparatus being in a non-driving condition.

Referring to FIGS. 1–8, there is shown drive apparatus 2 for a cycle 4. The drive apparatus 2 comprises an electric motor 6, a first pulley 8 which is driven by the electric motor 6, and the second pulley 10. An endless belt 12 passes around the first and the second pulleys 8, 10.

The drive apparatus 2 includes mounting means 14 for mounting the drive apparatus 2 to the cycle 4. The drive apparatus 2 is such that during use, the belt 12 is in driving engagement with a tire 16 of a wheel 18 of the cycle 4.

The mounting means 14 is such that it is a swinging link mounting means 14 which enables the distance between centers of the first and the second pulleys 8, 10 and the tire 16 to vary during use of the drive apparatus 2. This enables the drive apparatus 2 to exert on the tire 16 a varying contact pressure which increases in high torque conditions and which decreases in low torque conditions. The drive apparatus can thus always operate at optimum contact pressure between the belt 12 and the outer radial periphery of the tire 16. This means that the drive apparatus 2 can achieve optimum distance under power of a battery 20 before the battery 20 needs to be recharged.

The swinging link mounting means 14 comprises attachment means 22 for attaching the drive apparatus 2 to the cycle 4. The mounting means 14 also comprises pivot means 24 about which the electric motor 6, the first pulley 8, the second pulley 10 and the endless belt 12 pivot. The electric motor 6, the first pulley 8, the second pulley 10, and the endless belt 12 form transmission means 82 for the drive apparatus 2.

The transmission means 82 is counter-balanced such that in the equilibrium position, the endless belt 12 is spaced apart from the tire 16 but is in close proximity to the tire 16. Preferably, the endless belt 12 is not more than 10 mm from the tire 16. When power to the electric motor 6 is switched on, the reaction of the sudden acceleration of the rotor of the electric motor 6 moves the transmission means 82 about the pivot means 24 so that the endless belt 12 touches the tire 16. If the contact surface of the tire 16 is travelling slower than the contact surface of the endless belt 12, then the endless belt 12 will grip the tire 16 and drive the cycle 4. If the tire 16 is moving faster than the endless belt 12, then the endless belt 12 will not grip the tire 16 and the endless belt 12 will return to its counter-balance position in close proximity to the tire 16.

The transmission means 82 is counter-balanced about the pivot means 24 by having equal masses acting on either side of the pivot means 24. This ensures that jolt-induced accelerations due to road conditions act to create equal forces either side of the pivot means 24. There is therefore no moment created due to bumps and the transmission means 82 remains undisturbed with the endless belt 12 remaining slightly away from the tire 16 when the drive apparatus 2 is not being used, or with the endless belt 12 remaining in contact with the tire 16 when the drive apparatus 2 is being used and power is being transmitted.

The transmission means 82 is counter-balanced about the pivot means 24 by having equal masses acting on either side of the pivot means 24. This ensures that jolt-induced accelerations due to road conditions act to create equal forces either side of the pivot means 24. There is therefore no moment created due to bumps and the transmission means 82 remains undisturbed with the endless belt 12 remaining slightly away from the tyre 16 when the drive apparatus 2 is not being used, or with the endless belt 12 remaining in contact with the tyre 16 when the drive apparatus 2 is being used and power is being transmitted.

The battery 20 is used as a counter-balance for the weight of the transmission means 82, which includes the weight of the electric motor 6, the first pulley 8, the second pulley 10 and the endless belt 12. As can be seen from FIGS. 1, 2 and 3, the battery 20 pivots about a battery pivot 26. The battery 20 acts on a short moment arm 30 so that the battery 20 is able to counter balance the weight of the transmission means 82. The moment arm 30 is profiled to maintain the correct moment arm length to counterbalance the transmission means 82 as the transmission means 82 pivots.

The attachment means 22 comprises a first attachment arrangement 32 for attaching to handlebars 34 of the cycle 4, and a second attachment arrangement 36 for attaching to a head tube 38 of the cycle 4. The head tube 38 is positioned below the handlebars 34 as can be seen from the drawings.

Figure 7:
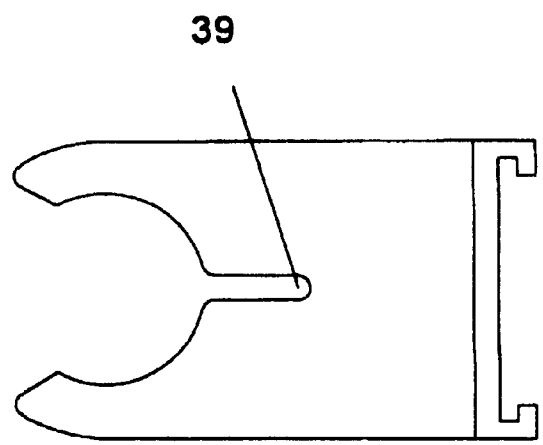
FIG. 7 is a plan view of a clamp device used in the drive apparatus.
Figure 8:
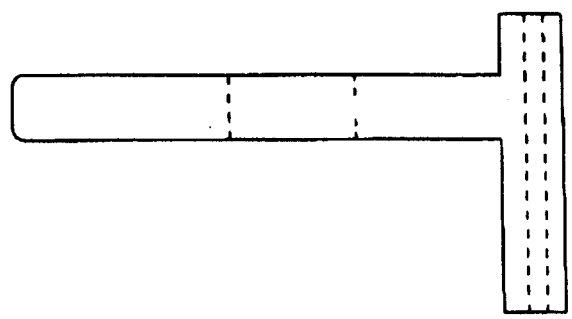
FIG. 8 is a side view of the clamp device shown in FIG. 7.

The second attachment arrangement 36 can be slid along the housing 44 to allow it to rest in a range of positions on the head tube 34. This allows the second mounting point to be adjusted to suit different cycles. The second attachment arrangement 36 spaces the housing 44 away from the head tube 38 in order to allow sufficient clearance for a brake assembly 45. The second attachment arrangement 36 can snap around a range of different head tube diameters and it provides a limited force that resists it being pulled off the head tube 38. This maintains the housing 44 in position when the cycle 4 is on a downhill gradient or is being manoeuvred. The second attachment arrangement 36 has a slot 39 as shown in FIG. 7 for enabling the second attachment arrangement 36 to be used in conjunction with brake cables that run parallel to the head tube 38 and turn with the handlebar 34 and front forks, typically cantilever brake assemblies.

The first attachment arrangement 32 is in the form of a clamp. The clamp consists of two hooks 40 that fit either side of a handlebar stem 42. Each hook 40 has a sliding part 43 which, when moved from the open position to the closed position, grips the handlebars 34 as can be appreciated from FIGS. 3 and 4.

Figure 2:
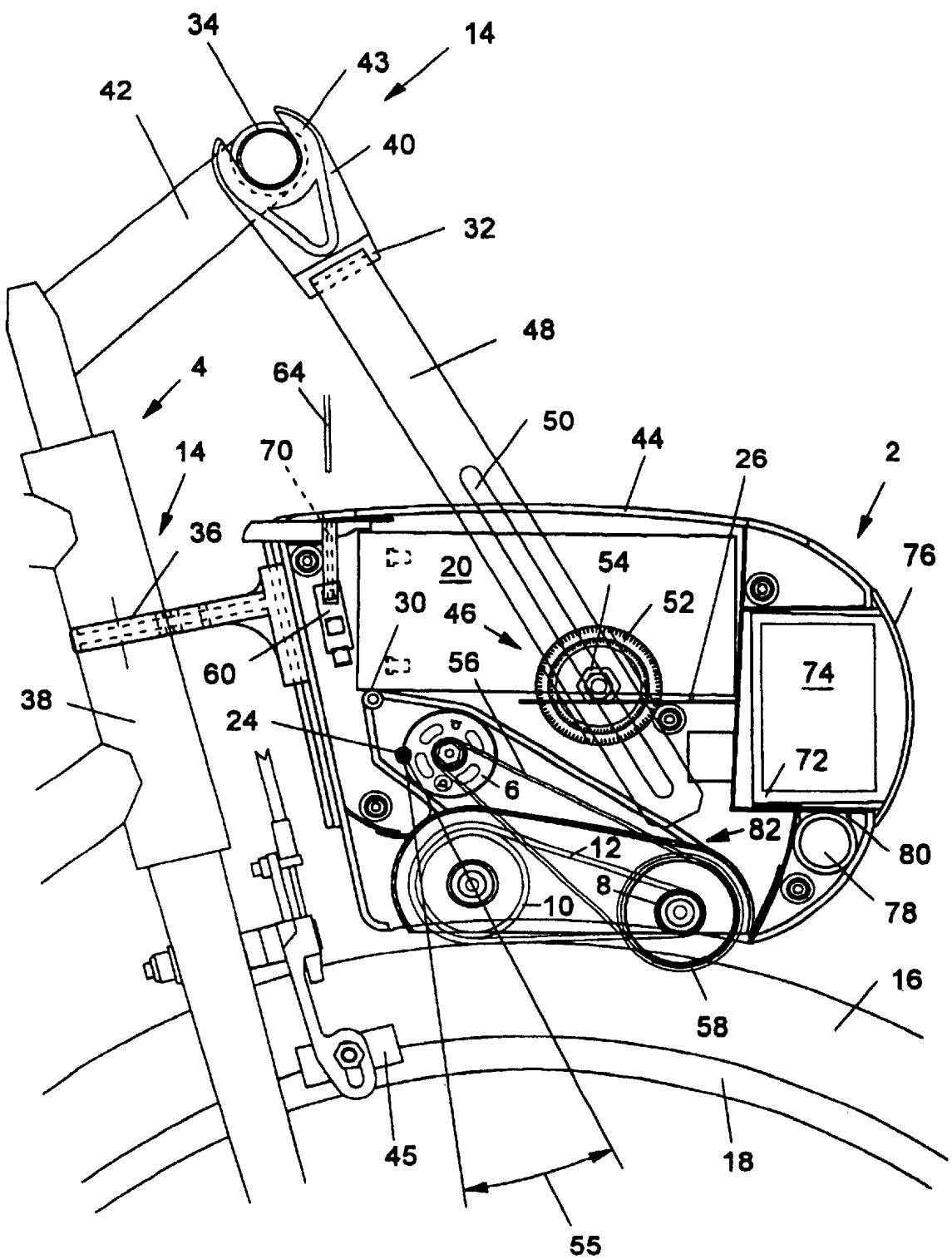
FIG. 2 is similar to FIG. 1 but shows more parts and the drive apparatus in a driving condition.
Figure 3:
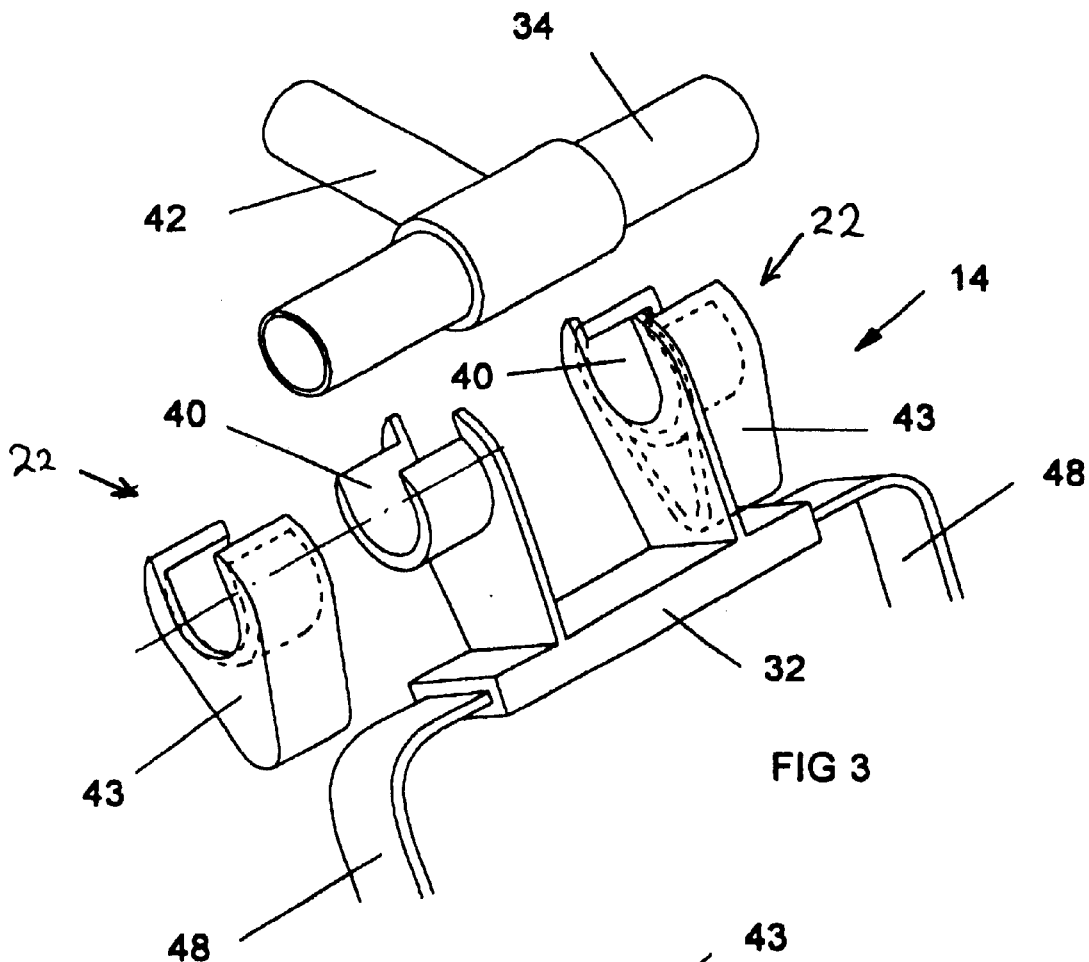
FIG. 3 shows handlebar clamps before mounting and with one sliding part removed.
Figure 4:
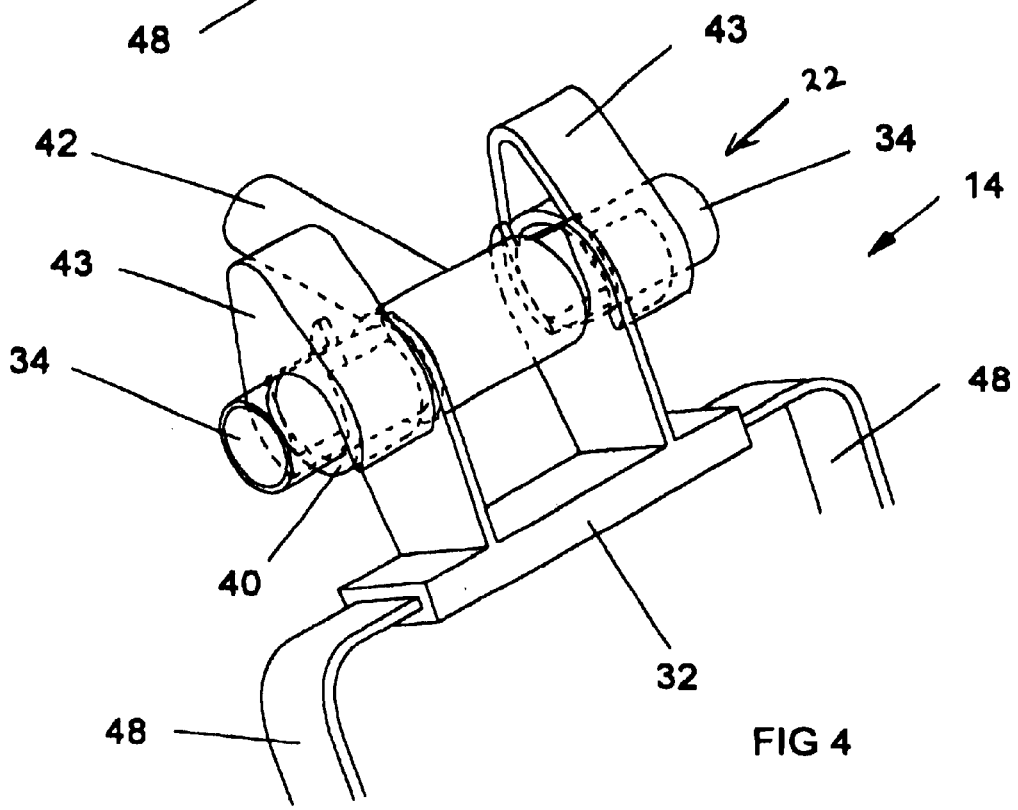
FIG. 4 shows the handlebar clamps of FIG. 3 and in the clamped position.
Figure 5:
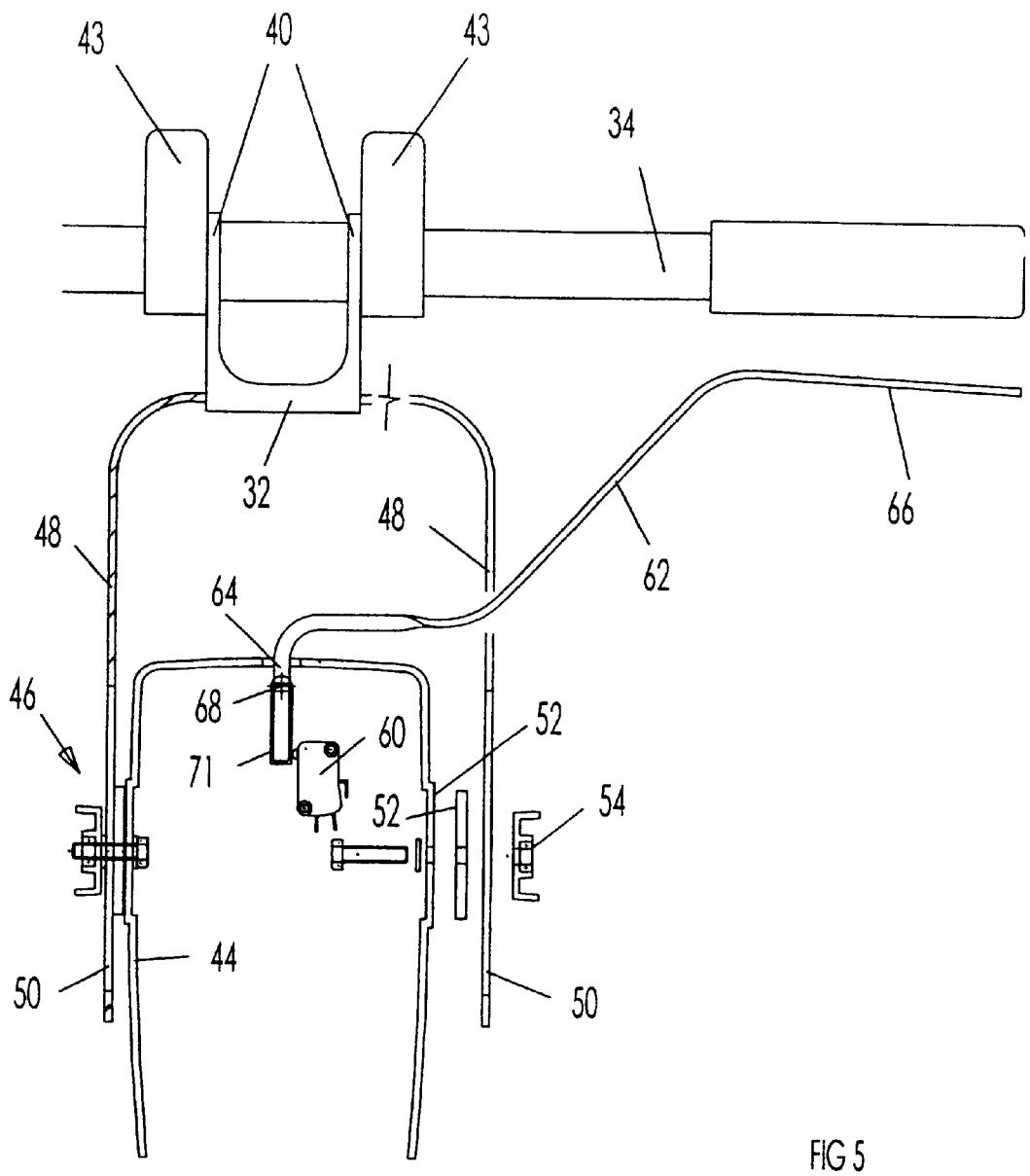
FIG. 5 is a front view of some parts of the apparatus as viewed in FIGS. 2, 3 and 4.

The drive apparatus 2 has a housing 44. Sliding fittings 46 are provided on each side of the housing 44. The sliding fittings 46 each accept a bar 48 from the first attachment arrangement 32. The angle of the bar 48 relative to the housing 44 and the length of the bar 48 can be adjusted by means of a slot 50 in the bar 48 and a ratchet 52 as shown in FIGS. 2 and 5. More specifically, the ratchet 52 is a serrated ratchet which gives angular locking and a nut 54 acts as a friction lock for length adjustment.

As can be seen from FIGS. 1 and 2, the drive apparatus 2 is situated above the tire 16. The tire 16 is a front tire of the cycle 4. A line passing through a centre of rotation of the second pulley 10 and the pivot means 24 (ie the line of force due to the pin jointed nature of the transmission) passes between the first attachment arrangement 32 and a seat of the cycle 4. This ensures that the effect of this force creates a moment that pushes the drive apparatus 2 down against the tire 16. This moment is resisted by the second attachment arrangement 36.

In order to achieve a satisfactory grip of the endless belt 12 with the tire 16, the angle 55 is set at between 17–21°. The effect of the above mentioned line of force and the angle 55 is such that the pivot means 24 has to be as close as possible to the cycle head tube 38. This would normally be expected to make it difficult physically to fit a counterbalance for the transmission. This difficulty is extremely neatly overcome by utilising the mass of the battery 20 as described above.

The drive apparatus 2 includes a belt reduction gearbox from the electric motor. This belt reduction gearbox comprises an endless belt 56 which passes around one end of the electric motor 6 as shown and which passes also around a pulley 58. The pulley 58 is attached to the first pulley 8 as shown.

An electric power on/off switch 60 is provided inside the housing 44. Link means in the form of a malleable length of metal 62 (see FIG. 5) is provided between the switch 60 and the handlebars 34. A first end 64 of the length of metal 62 activates the switch 60. A second end 66 is positioned below and adjacent the handlebars 34 as shown in FIG. 5 and this second end 66 forms a lever which is able to be gripped by a cyclist holding the handlebars 34. If the second end 66 is pulled up, then it causes the switch 60 to go to an on state and thus the electric motor 6 starts. If the second end 66 is then let go, the switch 60 moves to its off state and the electric motor 6 stops.

The end 64 of the length of malleable metal 62 activates the switch 60 via a pivot 68 as shown in FIG. 5. The use of a malleable length of metal 62 is advantageous insofar as the length of metal 62 can be bent to fit below a huge range of different handlebar designs, such that the cyclist is able to be presented with the second end 66 which can then act as a lever in a similar way to a brake lever. When the second end 66 is let go, gravity and/or a spring can be arranged to pivot a switch end 71 the opposite way to move the switch 62 to its off position. The switch 60 and the length of metal 62 are such that nothing needs to be attached to the handlebars 34, which makes fitting to a standard cycle extremely easy. The strip 62 is of flat section with a bend at end 64 in the flat plane giving maximum stiffness where bending stresses are highest. At end 66, the strip 62 has been twisted through 90° to give a comfortable flat shape under the fingers of a rider of the cycle 4.

Figure 6:
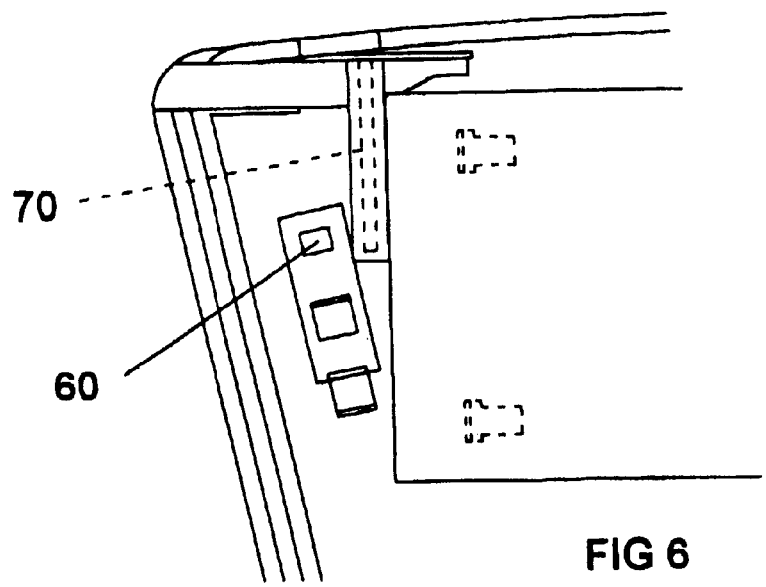
FIG. 6 shows in detail an electric power on/off switch used in the drive apparatus.

The malleable length of metal 62 can be withdrawn from a socket 70 as shown in FIG. 2, thereby offering a means of isolating the switch 60. As shown in FIG. 6, the switch 60 can be further isolated by moving the pivot 68 such that the switch 60 cannot be pressed by the first end 64 irrespective of whether the first end 64 is inserted into the socket 70 or not.

It is advantageous to have the switch 60 in the housing 44 and not on the handlebar 34. More specifically, the positioning of the switch 60 in the housing 44 enables a considerable reduction in the length of electric cable used, as compared with the case if the switch 60 were to be located on the handlebars 34. The length of the cable used equates to increasing electrical losses and loss of power, which is advantageously minimised as much as possible. The activation of the switch 60 by the length of metal 62 is such that the length of metal 62 is a mechanical link which thus enables the amount of electrical cable utilised to be kept to a minimum.

The drive apparatus 2 includes a recess 72 for receiving a battery charger 74 for charging the battery 20. The recess 72 accepts a drawer 76 containing the battery charger 74. The recess 72 and the drawer 76 together provide drip protection for the battery charger 74. The charger moulding is also used as cradle to aid the initial set up of the drive apparatus 2, that is when adjusting mounting points.

The provision of the electric motor 6, the battery 20, the battery charger 74 and the recess 72 all within one single housing 44 means that no spare parts need to be kept at home or attached to the cycle 4 separately.

The housing 44 has an aperture 78 which forms a security hole for accepting a U-lock or a chain for securing the drive apparatus 2 to the wheel 18 or to some other object. A lug 80 from the drawer 76 passes across the aperture 78 so that a U-lock or chain also passes through a part of the drawer 76 thereby securing the drawer 76 in position relative to the housing 44.

Figure 9:
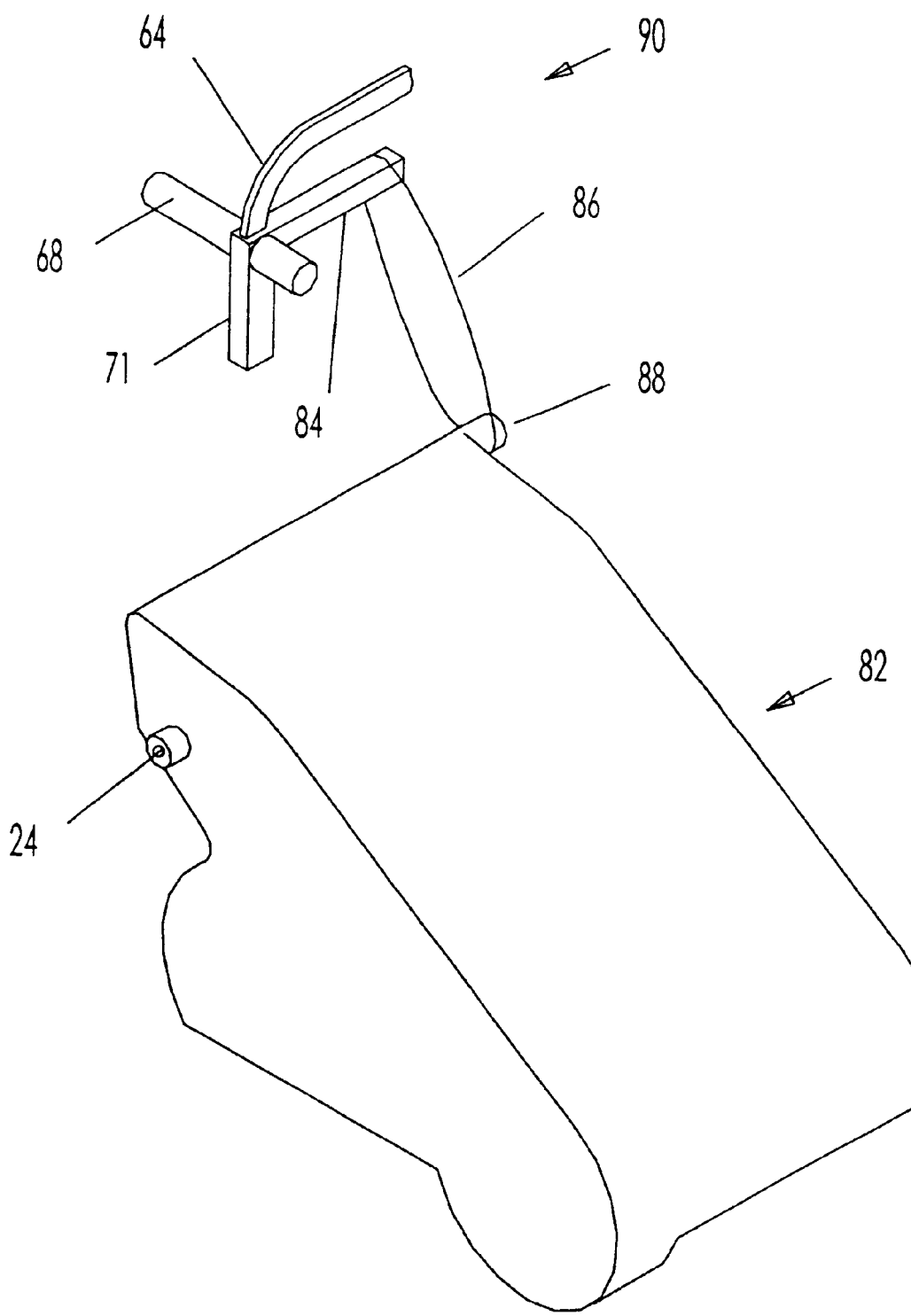
FIG. 9 is a simplified perspective view of alternative drive apparatus of the invention utilising dampening means.

Referring now to FIG. 9, there is shown an alternative swinging link mounting means 90. The swinging link mounting means 90 comprises a linkage in the form of an elastic band 86 that connects from an arm 84 on the pivot 68 to a point 88 on the transmission means 82 so that, when the strip 66 is raised, the transmission means 82 is pulled down on to the tire. This elastic band 86 acts as a dampening means. A linkage other than the elastic band 86 may be employed if desired.

It is to be appreciated that the embodiments of the invention described above with reference to the accompanying drawings have been given by way of example only and that modifications may be effected. Thus, for example, dampening means (not shown) may be fitted to damp oscillations of the transmission means relative to the housing 44. The cycle 4 may be a bicycle or a tricycle. The drive apparatus 2 may be fitted to a rear wheel of the cycle rather than to a front wheel. The second attachment arrangement 36 may be attached to the front forks or brakes instead of the head tube 38 of the cycle 4 if desired.

What is claimed is:

1. Drive apparatus for a cycle, which drive apparatus comprises an electric motor, a first pulley which is driven by the electric motor, a second pulley, an endless belt which passes around the two pulleys and which is driven by the first pulley, and mounting means for mounting the drive apparatus to the cycle, the drive apparatus being such that during use the endless belt is in driving engagement with a tire of a wheel of the cycle, the mounting means being such that it is a swinging link mounting means which enables the distance between centers of the first and the second pulleys and the tire to vary during use of the drive apparatus and thereby to enable the drive apparatus to exert on the tire a varying contact pressure which increases as transmitted torque increases, the swinging link mounting means comprising attachment means for attaching the drive apparatus to a cycle and pivot means about which the electric motor, the first pulley, the second pulley and the endless belt pivot, and the drive apparatus being characterised in that the electric motor, the first pulley, the second pulley and the endless belt form transmission means which is counter-balanced about the pivot means such that in an equilibrium position the endless belt is not in contact with the tire when the drive apparatus is not in use.

2. Drive apparatus according to claim 1 in which the transmission means is counter-balanced such that in the equilibrium position the endless belt is not more than 10 mm from the tire.

3. Drive apparatus according to claim 1 in which the transmission means is counter-balanced about the pivot means by having equal masses acting on either side of the pivot means.

4. Drive apparatus according to claim 1 in which the drive apparatus is for being situated above a front tire of the cycle such that a line passing through a center of rotation of the second pulley and the pivot means passes between a handlebar mounting point of the cycle and a seat of the cycle.

5. Drive apparatus according to claim 1 and including a belt reduction gearbox for the electric motor.

6. Drive apparatus according to claim 1 and including a housing for the electric motor, the first pulley and the second pulley; and an electric power on/off switch positioned within the housing.

7. Drive apparatus according to claim 1 in which the second pulley is nearer to the swinging link mounting means than the first pulley.

8. Drive apparatus according to claim 3 and including a battery for the electric motor, and in which the weight of the battery is used as a counter-balance for the weight of the transmission means.

9. Drive apparatus according to claim 6 and including link means between the on/off switch and handlebars of the cycle, the link means comprising a length of metal which has a first end for activating the on/off switch and which has a second end positioned below and adjacent the handlebars of the cycle for being gripped and pulled by a cyclist.

10. Drive apparatus according to claim 8 in which the mounting means comprises a first attachment arrangement for attaching to handlebars or a handlebar stem tube of the cycle, and a second attachment arrangement for attaching to another part of the cycle below the handlebars.

11. Drive apparatus according to claim 9 and including dampening means for dampening oscillations of the transmission means relative to the housing, a recess for receiving a mains charger for charging the battery, and an aperture which is in the housing and which is for receiving a security device for stopping theft of the drive apparatus from the cycle.

12. The combination of a cycle and drive apparatus, the drive apparatus comprising an electric motor, a first pulley which is driven by the electric motor, a second pulley, an endless belt which passes around the two pulleys and which is driven by the first pulley, and mounting means for mounting the drive apparatus to the cycle, the drive apparatus being such that during use the endless belt is in driving engagement with a tire of a wheel of the cycle, the mounting means being such that it is a swinging link mounting means which enables the distance between centers of the first and the second pulleys and the tire to vary during use of the drive apparatus and thereby to enable the drive apparatus to exert on the tire a varying contact pressure which increases as transmitted torque increases, the swinging link mounting means comprising attachment means for attaching the drive apparatus to a cycle and pivot means about which the electric motor, the first pulley, the second pulley and the endless belt pivot, and the drive apparatus being characterised in that the electric motor, the first pulley, the second pulley and the endless belt form transmission means which is counter-balanced about the pivot means such that in an equilibrium position the endless belt is not in contact with the tire when the drive apparatus is not in use.

* * * * *